United States Patent
Okamura et al.

(10) Patent No.: US 12,176,539 B2
(45) Date of Patent: Dec. 24, 2024

(54) NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: SHOWA DENKO MATERIALS CO., LTD., Tokyo (JP)

(72) Inventors: Wakana Okamura, Tokyo (JP); Kento Hoshi, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 564 days.

(21) Appl. No.: 17/420,142

(22) PCT Filed: Jan. 4, 2019

(86) PCT No.: PCT/JP2019/000034
§ 371 (c)(1),
(2) Date: Jul. 1, 2021

(87) PCT Pub. No.: WO2020/141573
PCT Pub. Date: Jul. 9, 2020

(65) Prior Publication Data
US 2022/0069303 A1   Mar. 3, 2022

(51) Int. Cl.
*H01M 4/583* (2010.01)
*H01M 10/0525* (2010.01)
*H01M 4/02* (2006.01)

(52) U.S. Cl.
CPC ....... *H01M 4/583* (2013.01); *H01M 10/0525* (2013.01); *H01M 2004/021* (2013.01); *H01M 2004/027* (2013.01)

(58) Field of Classification Search
CPC ....... H01M 10/0525; H01M 2004/021; H01M 2004/027; H01M 4/133; H01M 4/366; H01M 4/583; H01M 4/587; H01M 4/625; Y02E 60/10
See application file for complete search history.

(56) References Cited

U.S. PATENT DOCUMENTS

| | | | | |
|---|---|---|---|---|
| 2004/0062995 A1* | 4/2004 | Yanagida | ............... | H01M 4/133 429/223 |
| 2013/0011747 A1* | 1/2013 | Sasaki | .................... | C01B 32/05 429/207 |
| 2013/0071730 A1* | 3/2013 | Tokuda | ............. | H01M 10/0567 429/188 |
| 2017/0062822 A1* | 3/2017 | Hwang | ................. | H01M 4/364 |
| 2017/0110729 A1* | 4/2017 | Tsuchiya | ............... | H01M 4/587 |

FOREIGN PATENT DOCUMENTS

| | | |
|---|---|---|
| CN | 103620836 A | 3/2014 |
| CN | 106104871 A | 11/2016 |
| CN | 108281658 A | 7/2018 |
| CN | 108565463 A | 9/2018 |
| JP | H04-370662 A | 12/1992 |
| JP | H05-307956 A | 11/1993 |
| JP | H06-84516 A | 3/1994 |
| JP | H10-158005 A | 6/1998 |
| JP | H11-263612 A | 9/1999 |
| JP | 2012-33376 A | 12/2012 |
| JP | 2017-188473 A | 10/2017 |
| KR | 10-2014-0006967 A | 1/2014 |
| KR | 10-2016-0136320 A | 11/2016 |
| KR | 10-2021-0094079 A | 7/2021 |

* cited by examiner

Primary Examiner — Victoria H Lynch
(74) Attorney, Agent, or Firm — SOLARIS Intellectual Property Group, PLLC

(57) ABSTRACT

A negative electrode active material for a lithium ion secondary battery includes graphite particles for which an R value measured by Raman spectrometry is less than 0.27, and an intensity ratio (P1/P2) of a diffraction peak (P1) on a hexagonal structure (101) plane to a diffraction peak (P2) on a rhombohedral structure (101) plane in an X-ray diffraction pattern by CuKα ray is 5.0 or less.

6 Claims, No Drawings

NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

TECHNICAL FIELD

The present invention relates to a negative electrode material for a lithium ion secondary battery, a negative electrode for a lithium ion secondary battery, and a lithium ion secondary battery.

BACKGROUND ART

Lithium ion secondary batteries have been conventionally and widely used in electronic devices, such as notebook PCs, mobile phones, smartphones, and Tablet PCs, taking advantage of being compact and lightweight, as well as having a high energy density. With growing concerns about environmental issues such as global warming due to $CO_2$ emissions, in recent years, clean electric vehicles (EVs) which run solely on batteries, hybrid electric vehicles (HEVs) and plug-in hybrid electric vehicles (PHEVs) in which gasoline engines and batteries are combined, and the like are gaining popularity, lithium ion secondary batteries are used as on-board batteries for EVs, HEVs, PHEVs and the like. Lithium ion secondary batteries are now also used for electric power storage, and their applications are expanding into various fields.

The performance of negative electrode materials in lithium ion secondary batteries has great impact on input characteristics of the batteries. As materials for negative electrode materials for lithium ion secondary batteries, carbon materials are widely used. Carbon materials used for negative electrode materials are broadly divided into graphite, and carbon materials (amorphous carbon or the like) having a lower crystallinity than a crystallinity of graphite. Graphite has a structure in which hexagonal network planes composed of carbon atoms are regularly layered one on another, and in a case of being used for a negative electrode material in a lithium ion secondary battery, intercalation and deintercalation of lithium ions take place at the edges of the hexagonal network planes, to perform charging and discharging.

Amorphous carbon has a structure in which hexagonal network planes are irregularly layered, or do not have a hexagonal network plane. Accordingly, in a negative electrode material using amorphous carbon, the intercalation and deintercalation of lithium ions take place over an entire surface of the negative electrode material. Therefore, a lithium ion battery having excellent output characteristics tends to be obtained, as compared to the case of using graphite for a negative electrode material (see, for example, Patent Document 1 and Patent Document 2). However, since amorphous carbon has a crystallinity lower than the crystallinity of graphite, the amorphous carbon has a lower energy density than that of graphite.

RELATED ART DOCUMENTS

Patent Documents

Patent Document 1: Japanese Patent Application Laid-Open (JP-A) No. H04-370662
Patent Document 2: JP-A No. H05-307956

SUMMARY OF INVENTION

In on-board lithium ion secondary batteries for EVs, HEVs, PHEVs, and the like, there is a demand for a negative electrode material capable of further improving input characteristics related to regeneration efficiency, rapid charging, and the like. In addition, on-board lithium ion secondary batteries are also required to have high temperature storage characteristics. However, it has been difficult to achieve both input characteristics and high temperature storage characteristics at a higher level. In general, when the specific surface area of the negative electrode material is increased in order to improve the input characteristics, the high temperature storage characteristics tend to deteriorate. Meanwhile, when the specific surface area of the negative electrode material is reduced in order to improve the high temperature storage characteristics, the input characteristics tend to deteriorate. As described above, the input characteristics and the high temperature storage characteristics are generally in a trade-off relationship.

In view of the above described problems, an object of the invention is to provide a negative electrode material for a lithium ion secondary battery, a negative electrode for a lithium ion secondary battery, and a lithium ion secondary battery, which are excellent in input characteristics and high temperature storage characteristics.

Solution to Problem

The inventions include the following embodiments.
<1> A negative electrode material for a lithium ion secondary battery, the material including graphite particles for which an R value measured by Raman spectrometry is less than 0.27, and an intensity ratio (P1/P2) of a diffraction peak (P1) on a hexagonal structure (101) plane to a diffraction peak (P2) on a rhombohedral structure (101) plane in an X-ray diffraction pattern by CuKα ray is 5.0 or less.
<2> A negative electrode material for a lithium ion secondary battery, the material including graphite particles for which an R value measured by Raman spectrometry is less than 0.27, and an intensity ratio (P3/P4) of a diffraction peak (P3) on a carbon (002) plane to a diffraction peak (P4) on a carbon (110) plane in an X-ray diffraction pattern by CuKα ray is 1000 or less.
<3> The negative electrode material for a lithium ion secondary battery according to <1> or <2>, in which a volume average particle size of the graphite particles is from 2 μm to 30 μm.
<4> The negative electrode material for a lithium ion secondary battery according to any one of <1> to <3>, in which a BET specific surface area, according to a nitrogen gas adsorption method, of the graphite particles is from 2 $m^2$/g to 15 $m^2$/g.
<5> The negative electrode material for a lithium ion secondary battery according to any one of <1> to <4>, in which an average circularity of the graphite particles is 85% or more.
<6> The negative electrode material for a lithium ion secondary battery according to any one of <1> to <5>, in which an average aspect ratio (major axis/minor axis) of the graphite particles is 1.6 or less.
<7> The negative electrode material for a lithium ion secondary battery according to any one of <1> to <6>, in which amorphous carbon is present on at least a part of a surface of the graphite particles.

<8> A negative electrode for a lithium ion secondary battery, the negative electrode including:
a negative electrode material layer containing the negative electrode material for a lithium ion secondary battery according to any one of <1> to <7>; and
a current collector.
<9> A lithium ion secondary battery, including:
the negative electrode for a lithium ion secondary battery according to <8>;
a positive electrode; and
an electrolyte solution.

Advantageous Effects of Invention

According to the invention, a negative electrode material for a lithium ion secondary battery, a negative electrode for a lithium ion secondary battery, and a lithium ion secondary battery are provided, which are excellent in input characteristics and high temperature storage characteristics.

DESCRIPTION OF EMBODIMENTS

Embodiments of the invention will now be described in detail. It is to be noted, however, that the invention is not limited to the following embodiments. In the embodiments described below, components thereof (including element steps and the like) are not essential, unless otherwise specified. The same applies for numerical values and ranges thereof, and the invention is not limited thereto.

In the disclosure, any numerical range indicated using an expression "to" includes numerical values described before and after "to" as a minimum value and a maximum value, respectively.

In a numerical range described in stepwise, in the disclosure, the upper limit value or the lower limit value described in one numerical range may be replaced with the upper limit value or the lower limit value in another numerical range described in stepwise. Further, in a numerical range described in the disclosure, the upper limit value or the lower limit value described in the numerical range may be replaced with a value shown in Examples.

In the disclosure, each component may include plural kinds of substances corresponding to the component. In a case in which plural kinds of substances exist corresponding to a component in the composition, the content means, unless otherwise specified, a total amount of the plural kinds of substances existing in the composition.

In the disclosures, each component may include plural kinds of particles corresponding to the component. In a case in which plural kinds of particles exist corresponding to a component in the composition, the particle diameter means, unless otherwise specified, a value with respect to the mixture of the plural kinds of particles existing in the composition.

In the disclosure, the term "layer" comprehends herein not only a case in which the layer is formed over the whole observed region where the layer is present, but also a case in which the layer is formed only on part of the region.

<Negative Electrode Material for Lithium Ion Secondary Battery>

The negative electrode material for a lithium ion secondary battery in the disclosure includes graphite particles for which an R value measured by Raman spectrometry is less than 0.27, and an intensity ratio (P1/P2) of a diffraction peak (P1) on a hexagonal structure (101) plane to a diffraction peak (P2) on a rhombohedral structure (101) plane in an X-ray diffraction pattern by CuKα ray is 5.0 or less.

In addition, the negative electrode material for a lithium ion secondary battery in the disclosure includes graphite particles for which an R value measured by Raman spectrometry is less than 0.27 and an intensity ratio (P3/P4) of a diffraction peak (P3) on a carbon (002) plane to a diffraction peak (P4) on a carbon (110) plane in an X-ray diffraction pattern by CuKα ray is 1000 or less.

The negative electrode material for a lithium ion secondary battery may contain other components, if necessary.

By using the negative electrode material for a lithium ion secondary battery in the disclosure, it is possible to obtain a lithium ion secondary battery having excellent input characteristics and high temperature storage characteristics.

The negative electrode material for a lithium ion secondary battery in the disclosure includes graphite particles. For the graphite particles, the intensity ratio (P1/P2) of a diffraction peak (P1) on a hexagonal structure (101) plane to a diffraction peak (P2) on a rhombohedral structure (101) plane in an X-ray diffraction pattern by CuKα ray is 5.0 or less. Alternatively, the intensity ratio (P3/P4) of a diffraction peak (P3) on a carbon (002) plane to a diffraction peak (P4) on a carbon (110) plane in an X-ray diffraction pattern by CuKα ray is 1000 or less.

The intensity ratio (P1/P2) means that the smaller the value, the higher the content of graphite particles having a rhombohedral structure. Graphite particles having a rhombohedral structure are generated, for example, by pressurization when naturally occurring scale-like graphite is mechanically sphericalized. Therefore, as a method of reducing the intensity ratio (P1/P2) to 5.0 or less, there is a method of applying external pressure treatment to graphite. Specifically, as the method of applying external pressure treatment, a method using an apparatus such as a hybridization system (Nara Machinery Co., Ltd.) can be mentioned.

Further, the intensity ratio (P3/P4) means that the smaller the value, the smaller the spacing between carbon network planes (002). Graphite particles having a small spacing between carbon network planes (002) are generated, for example, by pressurization when naturally occurring scale-like graphite is mechanically sphericalized. Graphite, which is crystalline carbon, has a smaller spacing between carbon network planes (002) than amorphous carbon. Therefore, as a method of reducing the intensity ratio (P3/P4) to 1000 or less, there is a method of applying external pressure treatment to graphite. Specifically, as the method of applying external pressure treatment, a method using an apparatus such as a hybridization system (Nara Machinery Co., Ltd.) can be mentioned.

The intensity ratio (P1/P2) of graphite particles may be 5.0 or less, preferably 4.5 or less, more preferably 4.0 or less, and still more preferably 3.7 or less, and particularly preferably 3.6 or less.

The intensity ratio (P3/P4) of graphite particles may be 1000 or less, preferably 500 or less, more preferably 300 or less, still more preferably 200 or less, and particularly preferably 150 or less.

The X-ray diffraction pattern of graphite particles by CuKα ray can be obtained by irradiating a sample (graphite particles) with CuKα ray and measuring a diffraction line with a goniometer. Specifically, it can be measured under the following conditions.

Monochromator: Crystal monochromator
Scan mode: 2θ/θ
Scanning type: continuous
Output: 40 kV, 30 mA
Divergence slit: 5°

Scattering slit: 5°
Light receiving slit: 10 mm
Range of measurement: 0°≤2θ≤80°
Sampling width: 0.01°

In the obtained X-ray diffraction pattern, the half width of peak 2θ is obtained by converting it by the following Bragg's equation. The diffraction peaks having peak tops at the diffraction angles (2θ±0.2°) at the following positions are P1, P2, P3, and P4, respectively.

$$2d \sin \theta = n\lambda \qquad \text{Bragg's equation:}$$

Here, d is the crystal plane spacing, θ is the diffraction angle, n is the reflection order, and λ is the X-ray wavelength (0.15418 nm).

Diffraction peak P1: Diffraction angle around from 44° to 45°
Diffraction peak P2: Diffraction angle around from 42.5° to 43.5°
Diffraction peak P3: Diffraction angle around from 26° to 27°
Diffraction peak P4: Diffraction angle around from 70° to 80°

The preferable range of the intensity ratio (P1/P2) is as described above regardless of whether the graphite particles are coated graphite particles described later or graphite particles not coated with amorphous carbon. In addition, the preferable range of the intensity ratio (P3/P4) is as described above regardless of whether the graphite particles are coated graphite particles described later or graphite particles not coated with amorphous carbon.

Graphite particles have an R value of less than 0.27 as measured by Raman spectrometry.

The R value is the ratio of the peak intensity $I_{1350}$ of the second peak P2 showing the maximum intensity in a wavenumber range of from 1350 cm$^{-1}$ to 1370 cm$^{-1}$ with respect to the peak intensity $I_{1580}$ of the first peak P1 showing the maximum intensity in a wavenumber range of from 1580 cm$^{-1}$ to 1620 cm$^{-1}$ ($I_{1350}/I_{1580}$) in Raman spectrum analysis using green laser light having a wavelength of 532 nm. Here, the first peak P1 appearing in the wavenumber range of from 1580 cm$^{-1}$ to 1620 cm$^{-1}$ is usually a peak identified to correspond to the graphite crystal structure. The second peak P2 appearing in the wavenumber range of from 1350 cm$^{-1}$ to 1370 cm$^{-1}$ is usually a peak identified to correspond to the amorphous structure of carbon.

In the disclosure, the Raman spectrometry is carried out hereunder using a laser Raman spectrophotometer (Model number: NRS-1000, JASCO Corporation), by irradiating a sample plate of a negative electrode material for a lithium ion secondary battery set flatwise with a semiconductor laser light. The measurement conditions are as follows.

Wavelength of semiconductor laser light: 532 nm
Wavenumber resolution: 2.56 cm$^{-1}$
Measurement range: from 850 cm$^{-1}$ to 1950 cm$^{-1}$
Peak research: background removal The graphite particles may be surface-coated at least partially with amorphous carbon. As the graphite particles are surface-coated at least partially with amorphous carbon, the reactivity with the electrolyte solution on the surface of the graphite particles is reduced. Thus, the input/output characteristics tend to be improved while the initial charge-discharge efficiencies are favorably maintained. Whether or not amorphous carbon is present on the surface of the graphite particles can be determined based on the observation results by a transmission electron microscope (TEM).

Hereinafter, graphite particles that are surface-coated at least partially with amorphous carbon are also referred to as "coated graphite particles."

A content of amorphous carbon in the coated graphite particles is not particularly limited. From the viewpoint of improving the input/output characteristics, the content of amorphous carbon is preferably 0.1% by mass or more, more preferably 0.5% by mass or more, and still more preferably 1% by mass or more with respect to the total amount of the coated graphite particles. From the viewpoint of suppressing the decrease in capacity, the content of amorphous carbon is preferably 30% by mass or less, more preferably 20% by mass or less, and still more preferably 10% by mass or less.

The content of amorphous carbon can be determined by the following method.

(1) The coated graphite particles are heated at a heating rate of 15° C./minute, and a mass is measured in a range of from 30° C. to 950° C.

(2) A mass reduction at from 30° C. to 700° C. is defined as the mass of amorphous carbon.

The content of amorphous carbon is calculated by the following formula using the mass of amorphous carbon.

Content of amorphous carbon (% by mass)=(mass of amorphous carbon/mass of coated graphite particles at 30° C.)×100

The average thickness of amorphous carbon in the coated graphite particles is preferably 1 nm or more, more preferably 2 nm or more, and still more preferably 3 nm or more from the viewpoint of initial charge-discharge efficiencies and input characteristics.

Further, the average thickness of amorphous carbon in the coated graphite particles is preferably 500 nm or less, more preferably 300 nm or less, and still more preferably 100 nm or less from the viewpoint of energy density.

Also in the case of coated graphite particles, the R value is less than 0.27, preferably 0.26 or less, and more preferably 0.25 or less.

In the case of graphite particles that are not surface-coated with amorphous carbon, the R value is preferably 0.20 or less, more preferably 0.15 or less, and still more preferably 0.14 or less.

The method of obtaining graphite particles for which the intensity ratio (P1/P2) or intensity ratio (P3/P4) is within the above numerical range, and the R value is within the above range is not particularly limited. For example, one example is a method in which spherical graphite particles having an intensity ratio (P1/P2) or an intensity ratio (P3/P4) in the above numerical range are heat-treated in an atmosphere in which $CO_2$ gas, water vapor, $O_2$ gas, or the like is present. The reason why the R value can be kept within the above range by such heat treatment is not clear, but it can be assumed as follows.

For example, in the case of spherical graphite particles, fine particles generated by disintegration during mechanical spheroidization treatment adhere to the surface of the spherical graphite particles. These fine particles have low crystallinity. It is considered that by heat-treating the spherical graphite particles, the fine particles existing on the surface are burned and removed, and thus, the R value falls within the above range. However, the invention is not limited by the above assumption. In addition, the graphite particles to be heat-treated are not limited to spherical graphite particles, and may have an intensity ratio (P1/P2) or an intensity ratio (P3/P4) within the above numerical range. For example, it may be artificial graphite.

The atmosphere of the heat treatment is preferably an atmosphere in which $O_2$ gas is present (for example, an air atmosphere). In a case in which the heat treatment is performed in an atmosphere in which $O_2$ gas is present, a content of $O_2$ gas is preferably from 1% by volume to 30% by volume. By setting the $O_2$ gas content within the above range, the R value tends to be effectively within the above range.

A heat treatment time is preferably set, if appropriate depending on the gas atmosphere, treatment temperature, and the like. For example, in the case of heat treatment in an air atmosphere, the heat treatment temperature is preferably from 300° C. to 800° C. and more preferably from 400° C. to 750° C. Within this temperature range, the R value tends to be within the above range.

In addition, the heat treatment time in an air atmosphere varies depending on the heat treatment temperature, the type of graphite particles, and the like. It is preferably from 0.5 hours to 24 hours and more preferably from 1 hour to 6 hours. Within the above time, the R value tends to be effectively within the above range.

The heat treatment temperature in a case in which the heat treatment atmosphere is a $CO_2$ gas atmosphere is preferably from 600° C. to 1000° C., and more preferably from 700° C. to 900° C. In addition, the heat treatment time in a $CO_2$ gas atmosphere varies depending on the heat treatment temperature, the type of carbon material, and the like, for example, it is preferably from 0.5 hours to 24 hours, and more preferably from 1 hour to 6 hours.

The coated graphite particles can be obtained by coating graphite particles with amorphous carbon after performing the above-described heat treatment. Even in a case in which the graphite particles are coated with amorphous carbon without the heat treatment and then heat-treated, or the graphite particles are heat-treated while being coated with amorphous carbon, fine particles with low crystallinity adhering to the surface of graphite particles tend not to be sufficiently removed, whereby it may be difficult to keep the R value within the above-described range.

The coated graphite particles can be obtained by further heat-treating (i.e. second heat treatment) a mixture containing the graphite particles subjected to the above-described heat treatment and the precursor of amorphous carbon. The precursor of amorphous carbon is not particularly limited as long as it can be changed to amorphous carbon by heat treatment, and examples thereof include pitch and organic polymer compounds.

Examples of pitch include ethylene heavy end pitch, crude oil pitch, coal tar pitch, asphalt decomposition pitch, pitch produced by thermal decomposition of polyvinyl chloride, and pitch produced by polymerizing naphthalene and the like in the presence of super strong acid.

The softening point of pitch is preferably from 70° C. to 250° C., more preferably from 75° C. to 150° C., and still more preferably from 80° C. to 120° C. The softening point of pitch refers to a value obtained by the softening point measuring method (ring-ball method) of tar pitch described in JIS K 2425:2006.

Examples of organic polymer compounds include thermoplastic resins such as polyvinyl chloride, polyvinyl alcohol, polyvinyl acetate, and polyvinyl butyral, and natural substances such as starch and cellulose.

If necessary, the mixture may contain other particulate carbonaceous substance (e.g., carbonaceous particles) in addition to the precursor of amorphous carbon. In a case in which the mixture contains carbonaceous particles together with the precursor of amorphous carbon, amorphous carbon and the carbonaceous particles formed from the precursor of amorphous carbon may be the same or different in material.

Carbonaceous particles used as the other carbonaceous substance are not particularly limited, and examples thereof include particles of acetylene black, oil furnace black, Ketjen black, channel black, thermal black, and earthy graphite.

The method of preparing the mixture is not particularly limited, and examples thereof include wet mixing, powder mixing, and mechanical mixing.

In wet mixing, heat-treated graphite particles, a precursor of amorphous carbon, and if necessary, other carbonaceous substances (carbonaceous particles or the like) are mixed with a solvent, and then the solvent is removed.

In powder mixing, graphite particles, a precursor of amorphous carbon, and if necessary, other carbonaceous substances (carbonaceous particles or the like) are mixed in a powder state.

In mechanical mixing, graphite particles, a precursor of amorphous carbon, and if necessary, other carbonaceous substances (carbonaceous particles or the like) are mixed while applying mechanical energy.

A temperature when heat-treating (second heat treatment) the mixture is not particularly limited. For example, it is preferably from 700° C. to 1500° C., more preferably from 750° C. to 1300° C., and still more preferably from 800° C. to 1100° C. From the viewpoint of sufficiently advancing the carbonization of the precursor of amorphous carbon, the temperature of the second heat treatment is preferably 700° C. or higher. The temperature of second heat treatment temperature may be constant or may change from the start to the end of the second heat treatment.

A time of the second heat treatment is adjusted, if appropriate depending on the type of the precursor of amorphous carbon. For example, in a case in which coal tar pitch having a softening point of 100° C. (±20° C.) is used as the precursor of amorphous carbon, the temperature is preferably raised up to 400° C. at a rate of 10° C./minute or less. In the second heat treatment, a total time including the temperature raising process is preferably from 2 hours to 18 hours, more preferably from 3 hours to 15 hours, and still more preferably from 4 hours to 12 hours.

An atmosphere of the second heat treatment is not particularly limited as long as it is an inert gas atmosphere such as nitrogen gas or argon gas, and a nitrogen gas atmosphere is preferable from the industrial viewpoint.

A fired product obtained by the second heat treatment may be crushed by a cutter mill, a feather mill, a juicer mixer, or the like. The crushed fired product may be sieved.

A volume average particle size ($D_{50}$) of graphite particles (it means coated graphite particles in the case of graphite particles surface-coated at least partially with amorphous carbon) is preferably from 2 μm to 30 μm, more preferably from 5 μm to 25 μm, and even more preferably from 7 μm to 20 μm. When the volume average particle size of the graphite particles is 30 μm or less, the discharge capacity and the discharge characteristics tend to be improved. When the volume average particle size of the graphite particles is 2 μm or more, the initial charge-discharge efficiencies tend to be improved.

The volume average particle size ($D_{50}$) is determined as $D_{50}$ (median size) by measuring the volume-based particle size distribution using a laser diffraction particle size analyzer for particle size distribution measurement (for example, SALD-3000J, Shimadzu Corporation).

A BET specific surface area of graphite particles (it means coated graphite particles in the case of graphite particles surface-coated at least partially with amorphous carbon) according to the nitrogen gas adsorption method is preferably 2 m²/g to 15 m²/g, and more preferably 2 m²/g to 13 m²/g.

When the BET specific surface area of graphite particles is 2 m²/g or more, the input characteristics tend to be further improved. In addition, when the BET specific surface area of graphite particles is 15 m²/g or less, the tap density tends to increase, and the mixing property with other materials such as a binder and a conductive material tends to be favorable.

Further, the BET specific surface area of uncoated graphite particles is more preferably from 3 m²/g to 15 m²/g, and particularly preferably from 4 m²/g to 13 m²/g.

The BET specific surface area of coated graphite particles is more preferably from 2 m²/g to 10 m²/g, and particularly preferably from 2 m²/g to 8 m²/g.

The BET specific surface area can be calculated by measuring nitrogen adsorption at a liquid nitrogen temperature (77K) by a one-point method according to JIS Z 8830:2013. It can be calculated according to the BET method by measuring nitrogen adsorption at a liquid nitrogen temperature (77K) by the one-point method with a relative pressure of 0.3 using a mixed gas of nitrogen and helium (nitrogen:helium=3:7) with, for example, FlowSorb III 2310 (Shimadzu Corporation).

When measuring the BET specific surface area, it is considered that the water adsorbed on the sample surface and in structure affects the gas adsorption capacity. Therefore, it is preferable to first perform pretreatment by removing the water by heating.

In the pretreatment, for example, a measurement cell charged with 0.05 g of a measurement sample is decompressed to 10 Pa or less with a vacuum pump, heated at 110° C., retained for 3 hours or more, and then is naturally cooled to room temperature (25° C.) while being kept in a decompressed state. After performing this pretreatment, the evaluation temperature may be set to 77K, and the evaluation pressure range may be measured with a relative pressure (equilibrium pressure with respect to saturated vapor pressure) of less than 1.

An average circularity of graphite particles (it means coated graphite particles in the case of graphite particles surface-coated at least partially with amorphous carbon) is preferably 85% or more, more preferably 88% or more, and still more preferably 89% or more.

The circularity of graphite particles is a value obtained by dividing the peripheral length of a circle calculated from the equivalent circle diameter, which is the diameter of a circle having the same area as the projected area of graphite particles by the peripheral length (contour line length) measured from the projected image of an inorganic filler and multiplying by 100, which is calculated by the following formula. The circularity is 100% in a perfect circle.

$$\text{Circularity} = \{(\text{peripheral length of equivalent circle})/(\text{peripheral length of particle cross-sectional image})\} \times 100$$

Specifically, the average circularity of graphite particles is measured using a wet-flow type particle size and shape analyzer (for example, FPIA-3000, Malvern Panalytical Ltd.). A measurement temperature was 25° C., a concentration of a measurement sample is 10% by mass, and a number of particles to be counted is 12000. In addition, water is used as a dispersion solvent.

When measuring the circularity of graphite particles, it is preferable to disperse the graphite particles in water in advance. For example, it is possible to disperse graphite particles in water using an ultrasonic dispersion, a vortex mixer, or the like. In order to suppress the influence of particle decay or particle destruction of graphite particles, the intensity and time of ultrasonic waves may be adjusted, if appropriate in consideration of the intensity of the graphite particles to be measured.

For ultrasonic treatment, for example, it is preferable that after filling a tank of an ultrasonic cleaner (ASU-10D, AS ONE Corporation) with an arbitrary amount of water, a test tube containing a dispersion of graphite particles is immersed in the water inside the tank together with a test tube holder, followed by ultrasonic treatment for from 1 to 10 minutes. Within this treatment time, it becomes easy to disperse graphite particles while suppressing particle decay, particle destruction, an increase in the sample temperature, and the like of graphite particles.

An average aspect ratio (major axis/minor axis) of graphite particles (it means coated graphite particles in the case of graphite particles surface-coated at least partially with amorphous carbon) is preferably 1.6 or less, more preferably 1.5 or less, and still more preferably 1.4 or less.

When the average aspect ratio is 1.6 or less, the conductivity in the thickness direction of the electrode layer tends to be further improved.

The average aspect ratio of graphite particles is obtained by magnifying the graphite particles with a microscope, arbitrarily selecting 100 graphite particles, measuring the major axis/minor axis, and taking the arithmetic mean value of the measured values. Here, the length in the major axis direction is a distance between A and A' in a case in which when the observed graphite particles are sandwiched so as to be in contact with two parallel lines A and A', the interval therebetween becomes the largest. The length in the minor axis direction is a distance between B and B' in a case in which when the graphite particles are sandwiched between two parallel lines B and B' perpendicular to the two parallel lines A and A' that determine the length in the major axis direction, the interval therebetween becomes the largest.

<Negative Electrode for Lithium Ion Secondary Battery>

A negative electrode for a lithium ion secondary battery in the disclosure includes: a negative electrode material layer containing the negative electrode material for a lithium ion secondary battery in the disclosure described above; and a current collector. If necessary, the negative electrode for a lithium ion secondary battery may contain other components, in addition to the current collector and the negative electrode material layer containing the negative electrode material in the disclosure.

The negative electrode for a lithium ion secondary battery can be produced by, for example: kneading the negative electrode material for a lithium ion secondary battery and a binder, along with a solvent, to prepare a negative electrode material composition for a lithium ion secondary battery in a form of a slurry; and coating the resulting composition on a current collector to form the negative electrode material layer, or forming the negative electrode material composition for a lithium ion secondary battery in a form of a sheet, pellets, or the like, followed by integrating the resultant with a current collector. The kneading can be carried out using a dispersing apparatus such as an agitator, a ball mill, a super sand mill, or a pressure kneader.

The binder to be used for preparing the negative electrode material composition for a lithium ion secondary is not particularly limited. Examples of the binder include: an ethylenically unsaturated carboxylic acid ester, such as a styrene-butadiene copolymer (SBR), methyl acrylate, methyl methacrylate, ethyl acrylate, ethyl methacrylate, butyl acrylate, butyl methacrylate, hydroxyethyl acrylate, and hydroxyethyl methacrylate; and homopolymer or copolymer of an ethylenically unsaturated carboxylic acid, such as acrylic acid, methacrylic acid, itaconic acid, fumaric acid, and maleic acid; and a high molecular weight compound having a high ion conductivity, such as polyvinylidene fluoride, polyethylene oxide, polyepichlorohydrin, polyphosphazene, and polyacrylonitrile, polymethacrylonitrile. In a case in which the negative electrode material composition for a lithium ion secondary contains the binder, an amount of the binder is not particularly limited. For example, the amount of the binder may be from 0.5 parts by mass to 20 parts by mass with respect to 100 parts by mass of the total amount of the negative electrode material for a lithium ion secondary and the binder.

The negative electrode material composition for a lithium ion secondary may contain a thickener. As the thickener, it is possible to use, for example, carboxymethyl cellulose, methyl cellulose, hydroxymethyl cellulose, ethyl cellulose, polyvinyl alcohol, polyacrylic acid or a salt thereof, oxidized starch, phosphorylated starch, casein, or the like. In a case in which the negative electrode material composition for a lithium ion secondary contains the thickener, an amount of the thickener is not particularly limited. For example, the amount of the thickener may be from 0.1 parts by mass to 5 parts by mass with respect to 100 parts by mass of the amount of the negative electrode material for a lithium ion secondary.

The negative electrode material composition for a lithium ion secondary may contain a conductive auxiliary material. Examples of the conductive auxiliary material include: a carbon material, such as carbon black, graphite, and acetylene black; and an inorganic compound, such as an oxide and a nitride which exhibit electric conductivity. In a case in which the negative electrode material composition for a lithium ion secondary contains the conductive auxiliary material, an amount of the conductive auxiliary material is not particularly limited. For example, the amount of the conductive auxiliary material may be from 0.5 parts by mass to 15 parts by mass with respect to 100 parts by mass of the amount of the negative electrode material for a lithium ion secondary.

Materials for the current collector are not particularly limited, and can be selected from the group consisting of aluminum, copper, nickel, titanium, stainless steel, and the like. A form of the current collector is not particularly limited, and the current collector may be in a form of a foil, a perforated foil, a mesh, or the like. Further, a porous material such as a porous metal (expanded metal), a carbon paper, or the like can also be used as the current collector.

In a case in which the negative electrode material composition for a lithium ion secondary is coated on the current collector to form the negative electrode material layer, a method therefor is not particularly limited, and it is possible to use a known method, such as, for example, a metal mask printing method, an electrostatic spray painting method, a dip coating method, a spray coating method, a roll coating method, a doctor blade method, a comma coating method, a gravure coating method, or a screen printing method. After coating the negative electrode material composition for a lithium ion secondary on the current collector, the solvent contained in the negative electrode material composition for a lithium ion secondary is removed by drying. The drying can be carried out, for example, using a hot air dryer, an infrared dryer, or a combination of these apparatuses. If necessary, a rolling processing of the negative electrode material layer may be carried out. The rolling processing can be carried out by a method using a flat plate press, a calender roll, or the like.

In a case in which the negative electrode composition for a lithium ion secondary formed in the form of a sheet, pellets, or the like, is integrated with the current collector to form the negative electrode material layer, a method of integration is not particularly limited. For example, the integration can be carried out using a roll, a flat plate press, or by a combination of these means. It is preferable that the pressure to be applied during the integration of the negative electrode composition for a lithium ion secondary with the current is, for example, from about 1 MPa to 200 MPa.

A negative electrode density of the negative electrode material is not particularly limited. For example, the negative electrode density is preferably from 1.1 $g/cm^3$ to 1.8 $g/cm^3$, more preferably from 1.1 $g/cm^3$ to 1.7 $g/cm^3$, and still more preferably from 1.1 $g/cm^3$ to 1.6 $g/cm^3$. When the negative electrode density is adjusted to 1.1 $g/cm^3$ or more, an increase in electronic resistance tends to be prevented to result in an increased capacity. When the negative electrode density is adjusted to 1.8 $g/cm^3$ or less, decreases in input characteristics and cycle characteristics tend to be prevented.

<Lithium Ion Secondary Battery>

A lithium ion secondary battery in the disclosure includes: the negative electrode for a lithium ion secondary battery; a positive electrode; and an electrolyte solution.

The positive electrode can be obtained in the same manner as the method of preparing the negative electrode described above, by forming a positive electrode layer on a current collector. As the current collector, it is possible to use a metal or an alloy such as aluminum, titanium or stainless steel, formed in a form of a foil, a perforated foil, a mesh, or the like.

A positive electrode material used for forming the positive electrode layer is not particularly limited. Examples of the positive electrode material include a metal compound (such as a metal oxide and a metal sulfide) capable of doping or intercalating lithium ions, and an electrically conductive polymer material. More specific examples thereof include: a metal compound, such as lithium cobaltate ($LiCoO_2$), lithium nickelate ($LiNiO_2$), lithium manganate ($LiMnO_2$), a complex oxide thereof ($LiCo_xNi_yMn_zO_2$, in which x+y+z=1), a complex oxide containing an added element M' ($LiCo_aNi_bMn_cM'_dO_2$, in which a+b+c+d=1, M': Al, Mg, Ti, Zr or Ge), a spinel-type lithium manganese oxide ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, and olivine-type $LiMPO_4$ (M: Co, Ni, Mn, Fe); an electrically conductive polymer, such as polyacetylene, polyaniline, polypyrrole, polythiophene, and polyacene; and a porous carbon. The positive electrode material may be used singly, or in a combination of two or more kinds thereof.

The electrolyte solution is not particularly limited, and it is possible to use, for example, one obtained by dissolving a lithium salt as an electrolyte in a non-aqueous solvent (so-called an organic electrolyte solution).

Examples of the lithium salt include $LiClO_4$, $LiPF_6$, $LiAsF_6$, $LiBF_4$, and $LiSO_3CF_3$. The lithium salt may be used singly, or in a combination of two or more kinds thereof.

Examples of the non-aqueous solvent include ethylene carbonate, fluoroethylene carbonate, chloroethylene carbonate, propylene carbonate, butylene carbonate, vinylene carbonate, cyclopentanone, cyclohexylbenzene, sulfolane, propane sultone, 3-methylsulfolane, 2,4-dimethylsulfolane, 3-methyl-1,3-oxazolidin-2-one, γ-butyrolactone, dimethyl carbonate, diethyl carbonate, ethyl methyl carbonate, methylpropyl carbonate, butylmethyl carbonate, ethylpropyl carbonate, butylethyl carbonate, dipropyl carbonate, 1,2-dimethoxyethane, tetrahydrofuran, 2-methyltetrahydrofuran, 1,3-dioxolane, methyl acetate, ethyl acetate, trimethyl phosphate, and triethyl phosphate. The non-aqueous solvent may be used singly, or in a combination of two or more kinds thereof.

Forms of the positive electrode and the negative electrode in the lithium ion secondary battery are not particularly limited. For example, the positive electrode and the negative electrode, and if necessary, a separator disposed between the positive electrode and the negative electrode, may be wound in a form of a helix, or these components may be formed in the form of flat plates and layered one on another.

The separator is not particularly limited, and it is possible to use, for example, a nonwoven fabric made of a resin, a cloth, a microporous film, or a combination thereof. Examples of the resin include a resin containing, as a main component, a polyolefin, such as polyethylene or polypropylene. In a case in which the lithium ion secondary battery to be formed has a structure in which the positive electrode and the negative electrode are not directly in contact with each other, a separator is not necessarily used.

A form of the lithium ion secondary battery is not particularly limited. The lithium ion secondary battery may be, for example, a laminate-type battery, a paper-type battery, a button-type battery, a coin-type battery, a layered battery, a cylindrical battery, or a prismatic battery.

The lithium ion secondary battery in the disclosure is appropriate as a high capacity lithium ion secondary battery to be used in an electric vehicle, a power tool, a power storage apparatus, or the like, because of its excellent in input characteristics and high temperature storage characteristics. In particular, the lithium ion secondary battery in the disclosure is appropriate as a lithium ion secondary battery to be used in an electric vehicle (EV), a hybrid electric vehicle (HEV), a plug-in hybrid electric vehicle (PHEV) or the like, for which a capability to be charged and discharged at a high current is demanded in order to improve acceleration performance and brake regeneration performance.

EXAMPLES

The present invention will now be more specifically described by way of Examples. However, the present invention is in no way limited to the following Examples.

Example 1

(1) Preparation of Negative Electrode Material

Spherical natural graphite in an amount of 60 g (volume average particle size: 10 μm) as graphite particles was placed in an alumina crucible having a volume of 0.864 L, and allowed to stand for 1 hour in an air atmosphere at 500° C., thereby obtaining a negative electrode material.

[Measurement of R Value]

The Raman spectrometry was carried out hereunder using a laser Raman spectrophotometer (Model number: NRS-1000, JASCO Corporation), by irradiating a sample plate of a negative electrode material for a lithium ion secondary battery set flatwise with a semiconductor laser light. The measurement conditions are as follows.

Wavelength of semiconductor laser light: 532 nm
Wavenumber resolution: 2.56 $cm^{-1}$ Measurement range: from 850 cm 1 to 1950 cm 1
Peak research: background removal

[Measurement of X-ray Diffraction]

The negative electrode material was loaded into the recess of a quartz sample holder and set on the measurement stage. Measurement was performed with an X-ray diffractometer under the following measurement conditions. Details of the X-ray diffraction measurement using CuKα ray are as follows.

—Measuring Apparatus and Conditions—

X-ray diffractometer: Ultima IV, Rigaku Corporation
Monochromator: Crystal monochromator
Scan mode: 2θ/θ
Scanning type: continuous
Output: 40 kV, 30 mA
Divergence slit: 5° Scattering slit: 5°
Light receiving slit: 10 mm
Range of measurement: $0°≤2θ≤80°$ Sampling width: 0.01°

From the obtained X-ray diffraction pattern, the intensity ratio (P1/P2) of the diffraction peak (P1: diffraction angle 2θ=44.3°) on the hexagonal structure (101) plane to the diffraction peak (P2: diffraction angle 2θ=43.2°) on the rhombohedral structure (101) plane was calculated.

In addition, from the obtained X-ray diffraction pattern, the intensity ratio (P3/P4) of the carbon (002) plane diffraction peak (P3) detected with a diffraction angle of 2θ=around from 26° to 27° to the carbon (110) plane diffraction peak (P4) detected with a diffraction angle of 2θ=around from 70° to 80° was calculated.

[Volume Average Particle Size]

A dispersion liquid, in which the negative electrode material was dispersed in purified water together with a surfactant, was placed in a sample water tank of a laser diffraction particle size analyzer for particle size distribution measurement (SALD-3000J, Shimadzu Corporation). Next, the particle size distribution was obtained by circulating the dispersion liquid by a pump while applying ultrasound thereto, and the particle size having a cumulative volume percentage of 50% in the obtained particle size distribution was determined as the volume average particle size.

[Measurement of Specific Surface Area]

The specific surface area of negative electrode material was calculated according to the BET method by measuring nitrogen adsorption at a liquid nitrogen temperature (77K) by the one-point method with a relative pressure of 0.3 using a mixed gas of nitrogen and helium (nitrogen:helium=3:7) with a surface area analyzer for pore distribution measurement (FlowSorb III 2310, Shimadzu Corporation).

[Measurement of Average Circularity]

A 10% by mass aqueous dispersion was prepared by adding the negative electrode material to water, thereby obtaining a measurement sample. A test tube containing the measurement sample was placed together with a test tube holder in water contained in a tank of an ultrasonic cleaner (ASU-10D, AS ONE Corporation). Then, ultrasonic treatment was performed for from 1 minute to 10 minutes.

After the ultrasonic treatment, the average circularity of the graphite particles was measured at 25° C. using a wet-flow type particle size and shape analyzer (FPIA-3000, Malvern Panalytical Ltd.). The number of particles to be counted was 12000.

[Measurement of Average Aspect Ratio]

Graphite particles were magnified with a microscope, 100 graphite particles were arbitrarily selected, and the major axis/minor axis was obtained by the above-described method, thereby calculating the arithmetic mean value of the measured values.

(2) Preparation of Lithium Ion Secondary Battery

An aqueous solution of CMC (carboxymethyl cellulose, DKS Co. Ltd., Cellogen WS-C) (CMC concentration: 2% by mass) was added as a thickener to 98 parts by mass of the negative electrode material such that the solid content of CMC was 1 part by mass, and kneaded for 10 minutes. Next, purified water was added in several portions such that the total solid content concentration of the negative electrode material and CMC was from 45% by mass to 60% by mass, and kneaded for 10 minutes. Subsequently, an aqueous dispersion of SBR (styrene-butadiene copolymer, BM400-B, ZEON CORPORATION) (SBR concentration: 40% by mass) was added as a binder such that the solid content of SBR was 1 part by mass, and mixed for 10 minutes, thereby preparing a paste-like negative electrode material composition for a lithium ion secondary battery (negative electrode material composition). Then, the negative electrode material composition was applied to electrolytic copper foil having a thickness of 11 μm with a comma coater for which clearance was adjusted such that the coating amount per unit area was 4.5 mg/cm$^2$, thereby forming a negative electrode material layer. Thereafter, the negative electrode density was adjusted to 1.2 g/cm$^3$ by hand pressing. Electrolytic copper foil on which the negative electrode material layer was formed was punched into a disk shape having a diameter of 14 mm, thereby preparing a sample electrode (negative electrode).

(LiNi$_{1/3}$Mn$_{1/3}$Co$_{1/3}$O$_2$) (BET specific surface area: 0.4 m$^2$/g, average particle size (D50): 6.5 μm) was used as a positive electrode active material. Acetylene black (trade name: HS-100, average particle size: 48 nm (Denka Company's catalog value), manufactured by Denka Company) as a conductive material and polyvinylidene fluoride as a binder were sequentially added to this positive electrode active material, and mixed, thereby obtaining a mixture of a positive electrode material. The mass ratio was set to positive electrode active material: conductive material: binder=80:13:7. Further, N-methyl-2-pyrrolidone (NMP) as a dispersion solvent was added to the above mixture and kneaded, thereby forming a slurry. This slurry was applied to both sides of aluminum foil having an average thickness of 20 μm, which is a current collector for a positive electrode, substantially evenly and uniformly. Then, drying was carried out, followed by compression by pressing, thereby yielding a density of 2.7 g/cm$^3$. Thus, a positive electrode was prepared.

The prepared sample electrode (negative electrode), a separator, and a positive electrode were placed in a coin-type battery container in this order, and an electrolyte solution was injected thereinto, thereby preparing a coin-type lithium ion secondary battery. The electrolyte solution used was a mixture of ethylene carbonate (EC) and ethyl methyl carbonate (EMC) (volume ratio of EC and EMC was 3:7), in which LiPF$_6$ was dissolved at a concentration of 1.0 mol/L. The lithium ion secondary battery was designed so as to yield initial negative electrode capacity/initial positive electrode capacity=1.2.

As the separator, a polyethylene micropore membrane having a thickness of 20 μm was used. The prepared lithium ion secondary battery was charged with a constant current (CC) to 4.2 V at a current value equivalent to 0.2 CA, and then charged with a constant voltage (CV) to 0.02 CA. Thereafter, a 30-minute break was provided, discharging was carried out to 2.7 V with a current value equivalent to 0.2 CA, and another 30-minute break was provided. This series of processes was set as one cycle, and this was repeated for three cycles for initialization. The discharge capacity in the third cycle at such time is defined as SOC=100%. Using the initialized lithium ion secondary battery, the input characteristics and the high temperature storage characteristics were evaluated by the following methods.

[Evaluation of Input Characteristics]

The input characteristics were evaluated based on direct current resistance (DCR).

(1) The initialized lithium ion secondary battery was charged with a current value equivalent to 0.2 CA to SOC=50%.

(2) The battery was charged with a current value equivalent to 0.1 CA for 11 seconds, and the amount of change in voltage at the 10th second was determined.

(3) Then, after adjusting the SOC to 50% again, the battery was charged with a current value equivalent to 0.2 CA for 11 seconds, and the amount of change in voltage at the 10th second was determined.

(4) Similarly, the amount of change in voltage at 0.5 CA was determined, each current value and the value of the corresponding amount of voltage change were plotted, and the slope thereof was defined as DCR (52). The slope was calculated by the least-square method. All measurements were performed in a constant temperature bath at 25° C. and each measurement was spaced at intervals of 15 minutes.

[High Temperature Storage Characteristics]

(1) The initialized lithium ion secondary battery was charged with a constant current to 4.2 V at a current value equivalent to 0.2 CA, and then charged with a constant voltage of 4.2 V until the current value reached a level equivalent to 0.02 CA. Subsequently, it was discharged to 2.7 V at a current value equivalent to 0.2 CA. The discharge capacity at such time was defined as "discharge capacity 1" (mAh).

(2) The battery was charged with a constant current to 4.2 V at a current value equivalent to 0.2 CA, and then charged with a constant voltage until the current value reached a level equivalent to 0.02 CA at 4.2 V. The above measurements were performed in a constant temperature bath at 25° C. and each measurement was spaced at intervals of 15 minutes.

(3) The battery of (2) was allowed to stand in a constant temperature bath at 60° C. for 14 days.

(4) The battery of (3) was allowed to stand in a constant temperature bath at 25° C. for 5 hours, and then discharged with a constant current to 2.7 V at a current value equivalent to 0.2 CA. After providing an interval of 15 minutes, the battery was discharged with a constant current to 2.7 V at a current value equivalent to 0.2 CA.

(5) The battery of (4) was charged with a constant current to 4.2 V at a current value equivalent to 0.2 CA in a constant temperature bath at 25° C., and then charged with a constant voltage until the current value reached a level equivalent to 0.02 CA at 4.2 V. Subsequently, it was discharged to 2.7 V at a current value equivalent to 0.2 CA. The discharge capacity at such time was defined as "discharge capacity 2" (mAh). Each measurement was spaced at intervals of 15 minutes.

(6) From the "discharge capacity 1" obtained in (1) and the "discharge capacity 2" obtained in (5), the high temperature storage characteristics were obtained using the following Formula 1.

High temperature storage characteristics (%)=(discharge capacity 2/discharge capacity 1)×100

Example 2

A negative electrode material and a lithium ion secondary battery were prepared and evaluated in the same manner as in Example 1, except that the heat treatment temperature for the graphite particles was changed to 600° C. The obtained results are shown in Table 1.

Example 3

A negative electrode material and a lithium ion secondary battery were prepared and evaluated in the same manner as in Example 1, except that the heat treatment temperature for the graphite particles was changed to 700° C. The obtained results are shown in Table 1.

Comparative Example 1

A negative electrode material and a lithium ion secondary battery were prepared and evaluated in the same manner as in Example 1, except that the graphite particles was not heat-treatmented. The obtained results are shown in Table 1.

Comparative Example 2

Scale-like graphite particles were used directly as a negative electrode material without heat treatment, thereby preparing a lithium ion secondary battery. Evaluation was conducted in the same manner as in Example 1. The results obtained are shown in Table 1.

Example 4

A mixture was obtained by powder mixing of 100 parts by mass of the negative electrode material obtained in Example 1 with 7.5 parts by mass of coal-tar pitch (softening point: 98° C., residual coal rate: 50% by mass). Next, the mixture was heat-treated, thereby preparing a fired product having amorphous carbon adhered to the surface of the negative electrode material obtained in Example 1. The heat treatment was carried out by increasing the temperature from 25° C. to 1000° C. at a temperature increase rate of 200° C./hour under nitrogen flow and then maintaining the temperature at 1000° C. for 1 hour. The fired product obtained as a negative electrode material having amorphous carbon adhered to the surface thereof in Example 1 was crushed with a cutter mill and sieved with a 350-mesh sieve. The portion under the sieve was designated as a negative electrode material for a lithium ion secondary battery (negative electrode material). A lithium ion secondary battery was prepared using the obtained negative electrode material. Evaluation was conducted in the same manner as in Example 1. The results obtained are shown in Table 2.

Example 5

A negative electrode material for a lithium ion secondary battery (negative electrode material) having a surface to which amorphous carbon was adhered was obtained in the same manner as in Example 4, except that the negative electrode material obtained in Example 2 was used. A lithium ion secondary battery was prepared using the obtained negative electrode material. Evaluation was conducted in the same manner as in Example 1. The obtained results are shown in Table 2.

Example 6

A negative electrode material for a lithium ion secondary battery (negative electrode material) having a surface to which amorphous carbon was adhered was obtained in the same manner as in Example 4, except that the negative electrode material obtained in Example 3 was used. A lithium ion secondary battery was prepared using the obtained negative electrode material. Evaluation was conducted in the same manner as in Example 1. The obtained results are shown in Table 2.

Comparative Example 3

A negative electrode material for a lithium ion secondary battery (negative electrode material) having a surface to which amorphous carbon was adhered was obtained in the same manner as in Example 4, except that the graphite particles used as the crude material of Example 1 were directly used as a negative electrode material without heat treatment. A lithium ion secondary battery was prepared using the obtained negative electrode material. Evaluation was conducted in the same manner as in Example 1. The obtained results are shown in Table 2.

Comparative Example 4

A negative electrode material for a lithium ion secondary battery (negative electrode material) having a surface to which amorphous carbon was adhered was obtained in the same manner as in Example 4, except that the scale-like graphite particles were directly used as a negative electrode material without heat treatment. A lithium ion secondary battery was prepared using the obtained negative electrode material. Evaluation was conducted in the same manner as in Example 1. The results obtained are shown in Table 2.

TABLE 1

|  | Example 1 | Example 2 | Example 3 | Comparative Example 1 | Comparative Example 2 |
| --- | --- | --- | --- | --- | --- |
| Type of Graphite | Spherical natural graphite | Spherical natural graphite | Spherical natural graphite | Spherical natural graphite | Scale-like natural graphite |
| Coating with Amorphous Carbon. | uncoated | uncoated | uncoated | uncoated | uncoated |
| Temperature of Heat Treatment (° C.) | 500 | 600 | 700 | without heat treatment | without heat treatment |
| R Value | 0.13 | 0.11 | 0.1 | 0.27 | 0.08 |
| P1/P2 | 2.96 | 3.05 | 3.27 | 3.25 | 8.25 |

TABLE 1-continued

|  | Example 1 | Example 2 | Example 3 | Comparative Example 1 | Comparative Example 2 |
|---|---|---|---|---|---|
| P3/P4 | 45 | 43 | 38 | 84 | 1473 |
| Volume Average Particle Size (μm) | 10.7 | 10.9 | 10.9 | 10.8 | 36.3 |
| Specific Surface Are (m²/g) | 10.4 | 8.5 | 8.1 | 8.7 | 6.4 |
| Average Circularity (%) | 93.7 | 93.1 | 90.6 | 92.8 | 93.7 |
| Average Aspect Ratio (major axis/minor axis) | 1.21 | 1.19 | 1.17 | 1.23 | 1.80 |
| Input Characteristics (direct current resistance) (Ω) | 30.2 | 29.3 | 29.3 | 34.7 | 41.6 |
| High Temperature Storage Characteristics (%) | 88 | 89 | 89 | 88 | 70 |

TABLE 2

|  | Example 4 | Example 5 | Example 6 | Comparative Example 3 | Comparative Example 4 |
|---|---|---|---|---|---|
| Type of Graphite | Spherical natural graphite | Spherical natural graphite | Spherical natural graphite | Spherical natural graphite | Scale-like natural graphite |
| Coating with Amorphous Carbon. | coated | coated | coated | coated | coated |
| Temperature of Heat Treatment (° C.) | 500 | 600 | 700 | without heat treatment | without heat treatment |
| R Value | 0.23 | 0.21 | 0.19 | 0.30 | 0.19 |
| P1/P2 | 3.19 | 3.50 | 3.38 | 3.15 | 8.32 |
| P3/P4 | 46 | 42 | 50 | 43 | 1456 |
| Volume Average Particle Size (μm) | 11.0 | 11.0 | 11.1 | 10.9 | 37.1 |
| Specific Surface Are (m²/g) | 3.8 | 3.6 | 3.6 | 3.8 | 3.7 |
| Average Circularity (%) | 94.0 | 93.5 | 93.3 | 93.4 | 93.9 |
| Average Aspect Ratio (major axis/minor axis) | 1.19 | 1.16 | 1.15 | 1.19 | 1.61 |
| Input Characteristics (direct current resistance) (Ω) | 22.7 | 22.6 | 22.1 | 24.8 | 34.5 |
| High Temperature Storage Characteristics (%) | 92 | 93 | 93 | 92 | 79 |

As can be seen from the results shown in Tables 1 and 2, the lithium ion secondary batteries prepared using the negative electrode materials of Examples have excellent input characteristics and high temperature storage characteristics, as compared to the lithium ion secondary batteries prepared using the negative electrode materials of Comparative Examples.

The invention claimed is:

1. A negative electrode material for a lithium ion secondary battery, the negative electrode material comprising graphite particles for which an R value measured by Raman spectrometry is less than 0.27, and an intensity ratio (P1/P2) of a diffraction peak (P1) on a hexagonal structure (101) plane to a diffraction peak (P2) on a rhombohedral structure (101) plane in an X-ray diffraction pattern by CuKα ray is 3.6 or less, wherein a volume average particle size of the graphite particles is from 2 μm to 30 μm, the graphite particles are spherical natural graphite particles heat-treated in an atmosphere that includes $CO_2$ gas, water vapor, or $O_2$ gas, an average circularity of the graphite particles is 85% or more, and an average aspect ratio (major axis/minor axis) of the graphite particles is 1.6 or less.

2. The negative electrode material for a lithium ion secondary battery according to claim 1, wherein a BET specific surface area, according to a nitrogen gas adsorption method, of the graphite particles is from 2 m²/g to 15 m²/g.

3. The negative electrode material for a lithium ion secondary battery according to claim 1, wherein amorphous carbon is present on at least a part of a surface of the graphite particles.

4. A negative electrode for a lithium ion secondary battery, the negative electrode comprising:
   a negative electrode material layer containing the negative electrode material for a lithium ion secondary battery according to claim 1; and
   a current collector.

5. A lithium ion secondary battery, comprising:
   the negative electrode for a lithium ion secondary battery according to claim 4;
   a positive electrode; and
   an electrolyte solution.

6. A negative electrode material for a lithium ion secondary battery, the negative electrode material comprising graphite particles, for which an R value measured by Raman spectrometry is less than 0.27, and an intensity ratio (P3/P4) of a diffraction peak (P3) on a carbon (002) plane to a diffraction peak (P4) on a carbon (110) plane in an X-ray diffraction pattern by CuKα ray is 300 or less, wherein the graphite particles are spherical natural graphite particles heat-treated in an atmosphere that includes $CO_2$ gas, water vapor, or $O_2$ gas, an average circularity of the graphite particles is 85% or more, and an average aspect ratio (major axis/minor axis) of the graphite particles is 1.6 or less.

\* \* \* \* \*